US 11,835,129 B2

(12) United States Patent
Peters

(10) Patent No.: US 11,835,129 B2
(45) Date of Patent: Dec. 5, 2023

(54) CONTROL UNIT AND METHOD FOR PROVIDING A MANUAL SHIFT MODE

(71) Applicant: Bayerische Motoren Werke Aktiengesellschaft, Munich (DE)

(72) Inventor: Stephan Peters, Vaterstetten (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 219 days.

(21) Appl. No.: 17/594,710

(22) PCT Filed: Jun. 16, 2020

(86) PCT No.: PCT/EP2020/066580
§ 371 (c)(1),
(2) Date: Oct. 27, 2021

(87) PCT Pub. No.: WO2021/001142
PCT Pub. Date: Jan. 7, 2021

(65) Prior Publication Data
US 2022/0205531 A1 Jun. 30, 2022

(30) Foreign Application Priority Data
Jul. 1, 2019 (DE) ..................... 10 2019 117 632.8

(51) Int. Cl.
*F16H 59/02* (2006.01)
*F16H 59/04* (2006.01)
*F16H 61/02* (2006.01)

(52) U.S. Cl.
CPC ..... *F16H 59/0204* (2013.01); *F16H 59/0217* (2013.01); *F16H 59/044* (2013.01);
(Continued)

(58) Field of Classification Search
CPC ............. F16H 59/0204; F16H 59/0217; F16H 59/044; F16H 61/0213; F16H 2059/0239; F16H 2061/0244; F16H 59/02
See application file for complete search history.

(56) References Cited

U.S. PATENT DOCUMENTS

2016/0363213 A1* 12/2016 Adames ............... F16H 59/0204
2017/0023127 A1   1/2017 Greasamar et al.

FOREIGN PATENT DOCUMENTS

DE        43 11 852 A1    9/1994
DE   10 2006 010 909 A1    9/2007
(Continued)

OTHER PUBLICATIONS

International Search Report (PCT/ISA/210) issued in PCT Application No. PCT/EP2020/066580 dated Aug. 17, 2020 with English translation (four (4) pages).

(Continued)

*Primary Examiner* — Justin Holmes
(74) *Attorney, Agent, or Firm* — Crowell & Moring LLP

(57) ABSTRACT

A control unit is provided for an automatic transmission of a vehicle. The vehicle has a gear selection operating element which allows a user of the vehicle to set different gear stages of the transmission by actuating the gear selection operating element, and the vehicle has at least one setting operating element which allows the user to change the value of a parameter of a function of the vehicle by actuating the setting operating element when the function of the vehicle is activated. The control unit is designed to detect an actuation of the gear selection operating element for a period of time which is equal to or longer than a minimum duration and to determine that the function of the vehicle is deactivated. In response thereto, the control unit is additionally designed to
(Continued)

allow a manual change of the transmission gear by actuating the at least one setting operating element.

10 Claims, 2 Drawing Sheets

(52) U.S. Cl.
CPC . *F16H 61/0213* (2013.01); *F16H 2059/0239* (2013.01); *F16H 2061/0244* (2013.01)

(56) References Cited

FOREIGN PATENT DOCUMENTS

| | | | |
|---|---|---|---|
| DE | 10 2006 028 045 A1 | 12/2007 | |
| DE | 10 2018 209 275 A1 | 12/2019 | |
| FR | 3035165 A1 * | 10/2016 | ......... F16H 59/0204 |
| WO | WO-2016035711 A1 * | 3/2016 | ......... F16H 59/0204 |

OTHER PUBLICATIONS

German-language Written Opinion (PCT/ISA/237) issued in PCT Application No. PCT/EP2020/066580 dated Aug. 17, 2020 (seven (7) pages).

German-language Search Report issued in German Application No. 10 2019 117 632.8 dated Mar. 20, 2020 with partial English translation (10 pages).

* cited by examiner

CONTROL UNIT AND METHOD FOR PROVIDING A MANUAL SHIFT MODE

BACKGROUND AND SUMMARY OF THE INVENTION

The invention relates to a control unit and a corresponding method for providing a manual shift mode for an automatic (shift) transmission of a vehicle.

A vehicle can have an automatic transmission which is designed to set a suitable gear (i.e., a suitable transmission ratio) of the transmission automatically in dependence on the respective existing driving situation. The vehicle can optionally have a gear selection lever which, in addition to an automatic lane for setting the different gear stages (e.g., "P", "N", "D", or "R") for the automatic operation of the transmission, also has an additional manual lane in which the different gears of the transmission can be set manually by the driver of the vehicle. Alternatively or additionally, dedicated operating elements (in particular rocker switches or paddles) can be provided in a vehicle, which enable the driver of the vehicle to effectuate manual gear changes.

The provision of a gear selection lever having multiple lanes for different operating modes (in particular for a manual shift mode and for an automatic shift mode) of an automatic transmission and/or the provision of dedicated rocker switches for manual gear changes are linked to additional costs, weight, and installation space requirements.

The present document relates to the technical object of reducing the costs, the weight, and the required installation space for the manual operation of an automatic transmission.

The object is achieved by the respective independent claims. Advantageous embodiments are described, inter alia, in the dependent claims. It is to be noted that additional features of a claim dependent on an independent claim, without the features of the independent claim or only in combination with a subset of the features of the independent claim, can form a separate invention independent of the combination of all features of the independent claim, which can be made the subject matter of an independent claim, a divisional application, or a subsequent application. This applies in the same way to technical teaching described in the description, which can form an invention independent of the features of the independent claims.

According to one aspect, a control unit for an automatic transmission of a vehicle, in particular a motor vehicle, is described. The automatic transmission can be designed, during operation in the gear stages "D" or "L", to automatically change the (forward) gears of the transmission (for example, having 5 or more, 6 or more, or 7 or more gears). The transmission can have, for example (possibly precisely) the gear stages "P", "N", "D", and "R" and possibly "L".

The vehicle comprises a gear selection operating element, which enables a user of the vehicle to set different gear stages of the transmission by actuating the gear selection operating element. The gear selection operating element can be arranged, for example, in the center console of the vehicle. Alternatively or additionally, the gear selection operating element can comprise a gear selection lever which can be deflected in a first (for example a forward) direction or in an (opposing) second (for example a reverse) direction to change the gear stage of the transmission. The gear selection operating element can be made monostable, so that the gear selection operating element automatically returns back into a base position after an actuation (in particular after a deflection) (wherein the base position is arranged in particular between the first direction and the second direction of the actuation of the gear selection operating element).

The gear selection operating element preferably has only a single lane for setting gear stages. In particular, the gear selection operating element preferably does not have a lane in which manual gear changes can be effectuated by actuating the gear selection operating element. Alternatively or additionally, the gear selection operating element can be designed not to enable manual changes of gears of the transmission. Therefore, a gear selection operating element which is efficient with respect to costs, weight, and installation space can be provided.

Furthermore, the vehicle comprises at least one setting operating element which enables the user to change a value of a parameter of a (primary or basic) function of the vehicle by actuating the setting operating element, when the function of the vehicle is activated. The setting operating element can be arranged, for example, on the steering device, in particular on the steering wheel, of the vehicle to enable comfortable operation by the user, in particular by the driver, of the vehicle.

The (primary or basic) function of the vehicle can comprise a driver assistance function and/or a comfort function of the vehicle. In particular, the function of the vehicle can enable at least partially automated longitudinal guidance of the vehicle. In one preferred example, the function of the vehicle enables automated limiting and/or automated setting of the travel velocity of the vehicle (as in, for example, a limiter or a cruise control). The parameter of the function can comprise, for example, a travel velocity of the vehicle (for example a permissible maximum velocity or a set velocity). Alternatively, the function of the vehicle can enable an audio playback of audio signals in the vehicle (for example as part of an infotainment system of the vehicle). In this case, the parameter can comprise a volume of the audio playback. Alternatively, the function can enable a navigation in a selection menu of a user interface of the vehicle. In this case, the parameter can enable a movement (for example up or down, or right or left) within the selection menu.

In general, the (primary or basic) function of the vehicle can be designed in such a way that the function has a parameter which can be changed in two opposite directions. The change of the value of the parameter can be effectuated here by actuating the setting operating element.

The value of the parameter can typically be set by actuating the setting operating element in a (possibly linear) value range between a minimum value and a maximum value when the function of the vehicle is activated. An increase or a reduction of the value of the parameter can possibly be effectuated here by actuating the setting operating element in a specific operating direction (for example up/down or right/left). For example, the travel velocity for the operation of the function of the vehicle can typically be set between a minimum velocity and a maximum velocity. Alternatively, the playback volume can possibly be set between a minimum volume and a maximum volume. Alternatively, scrolling between the ends of a selection menu (in particular between a list beginning and a list end) can be effectuated.

The control unit can be configured to ignore an actuation or (possibly all) actuations of the setting operating element with respect to the setting of the value of the parameter of the function of the vehicle if the function of the vehicle is deactivated. In other words, the setting operating element can be designed in such a way that no changes of the value of the parameter of the function can be effectuated by the setting operating element if the function is deactivated.

The control unit is configured to detect an actuation (in particular a deflection) of the gear selection operating element for a duration which is equal to or longer than a minimum duration. The gear selection operating element can be designed in such a way that a change of the gear stage can be effectuated by a relatively short actuation (for example by an actuation having a (minimum) trigger duration). The minimum duration is typically longer than the (minimum) trigger duration (for example by the factor 3 or more, 5 or more, or 10 or more). The minimum duration can be, for example, 4 seconds or more or 5 seconds or more. A relatively long actuation (in particular deflection) of the gear selection operating element can therefore be detected.

The control unit is furthermore configured to determine that the function of the vehicle is deactivated. For example, it can be recognized that the user of the vehicle has deactivated the function by actuating an activating operating element or has not activated the function. It can therefore be recognized by the control unit that the at least one setting operating element cannot be used for the setting of the value of the parameter of the function, and/or that the at least one setting operating element is unused.

The control unit is furthermore configured (possibly only) in reaction thereto to arrange that a manual change of a gear of the transmission can be effectuated by actuating the at least one setting operating element. In other words, it can be effectuated that the (otherwise (due to the deactivated function) unused) setting operating element of the function of the vehicle can be used to enable manual changes of the gears of the transmission.

In particular, the control unit can be configured to activate the manual shift mode of the transmission (possibly only then) if it is detected that the gear selection operating element is actuated for the minimum duration or longer and if it is determined that the function of the vehicle is deactivated. One or more corresponding gear changes can then be enabled by one or more actuations of the setting operating element when the transmission is in the manual shift mode.

Using the setting operating element of a function of the vehicle to provide a manual shift mode of the automatic transmission is thus enabled if needed. A manual shift mode can thus be provided in a manner efficient in cost, weight, and installation space (also upon use of a gear selection operating element efficient in cost, weight, and installation space, which, for example, does not have a lane for manual gear changes).

The setting operating element can comprise a rocker switch which is designed to be tilted in a first direction to increase the value of the parameter when the function of the vehicle is activated or (alternatively) to increase (or possibly to reduce) the gear of the transmission manually if the transmission is in the manual shift mode. Alternatively or additionally, the rocker switch can be designed to be tilted in a second direction to reduce the value of the parameter if the function of the vehicle is activated or (alternatively) to reduce (or possibly to increase) the gear of the transmission manually if the transmission is in the manual shift mode.

Alternatively or additionally, the setting operating element can comprise a plus button which is designed to increase the value of the parameter as a result of an actuation when the function of the vehicle is activated or (alternatively) to increase (or possibly to reduce) the gear of the transmission manually if the transmission is in the manual shift mode. Furthermore, the setting operating element can comprise a minus button which is designed to reduce the value of the parameter as a result of an actuation if the function of the vehicle is activated or (alternatively) to reduce (or possibly to increase) the gear of the transmission manually if the transmission is in the manual shift mode.

Alternatively or additionally, the setting operating element can be coded and/or designed in such a way that an increase or a reduction of the value of the parameter can be effectuated by tilting the setting operating element in a first direction (for example upward or to the right), and/or a reduction or an increase of the value of the parameter can be effectuated by tilting the setting operating element in an opposite second direction (for example downward or to the left). A semantic coding of the setting operating element can thus be provided.

Alternatively or additionally, the setting operating element can comprise a slider which is designed to be pushed in a first direction to increase the value of the parameter if the function of the vehicle is activated or (alternatively) to increase (or possibly to reduce) the gear of the transmission manually if the transmission is in the manual shift mode. Furthermore, the slider can be designed to be pushed in a second direction to reduce the value of the parameter if the function of the vehicle is activated or (alternatively) to reduce (or possibly to increase) the gear of the transmission manually if the transmission is in the manual shift mode.

Alternatively or additionally, the setting operating element can comprise a rotating knob which is designed to be rotated in a first direction to increase the value of the parameter if the function of the vehicle is activated or (alternatively) to increase (or possibly to reduce) the gear of the transmission manually if the transmission is in the manual shift mode. Furthermore, the rotating knob can be designed to be rotated in a second direction to reduce the value of the parameter if the function of the vehicle is activated or (alternatively) to reduce (or possibly to increase) the gear of the transmission manually if the transmission is in the manual shift mode.

A particularly efficient and convenient manual shift mode of the transmission can be provided by the provision and/or use of one or more setting operating elements designed in this way.

The gear selection operating element can be designed by repeated actuation (in particular deflection) in a second direction (for example in the reverse direction) to gradually change the gear stage starting from a second limiting gear stage (for example the gear stage "P" or "N") to a first limiting gear stage (for example the gear stage "D" or "L"). For example, the different gear stages can be arranged in a series, wherein the series of gear stages is delimited by the first limiting gear stage on the first side and by the second limiting gear stage on the second side. Furthermore, the gear selection operating element can be designed in such a way that, starting from the first limiting gear stage, no further gear stage change can (still) be effectuated by an actuation in the second direction.

The control unit can be configured to detect that the gear selection operating element is actuated starting from the first limiting gear stage for the minimum duration or longer in the second direction. In other words, it can be detected that the relatively long actuation of the gear selection operating element takes place in such a way that no gear stage change can be effectuated by the actuation.

In reaction thereto (possibly only then if the relatively long actuation takes place in such a way that a gear stage change cannot be effectuated by the actuation), it can be arranged that a manual gear change of the transmission can be effectuated by actuating the at least one setting operating element. In other words, in reaction thereto the manual driving mode of the transmission can be activated.

The reliability of the activation of the manual driving mode is further increased by the use of an actuation of the gear selection operating element as (possibly the only) trigger for the activation of the manual driving mode, by which no gear stage change can be effectuated.

The control unit can be configured to detect that the gear selection operating element is actuated and/or that the function of the vehicle is activated while the transmission is in the manual shift mode. In reaction thereto, the transmission can then be transferred from the manual shift mode (back) into the automatic shift mode. Reliably leaving the manual shift mode (to reactivate the automatic shift mode) is thus enabled.

According to a further aspect, a (preferably multitrack) (road) motor vehicle (in particular a passenger vehicle or a truck or a bus) is described, which comprises the control unit described in this document and/or the transmission, gear selection operating element, and/or setting operating element described in this document.

According to a further aspect, a method for operating an automatic transmission of a vehicle is described. The vehicle comprises a gear selection operating element which enables a user of the vehicle to set different gear stages of the transmission by actuating the gear selection operating element. The vehicle furthermore comprises at least one setting operating element which enables the user to change a value of a parameter of a function of the vehicle by actuating the setting operating element (possibly only then) if the function of the vehicle is activated.

The method comprises detecting an actuation of the gear selection operating element for a duration which is equal to or longer than a (predefined) minimum duration. Furthermore, the method comprises determining that the function of the vehicle is deactivated. The method furthermore comprises, in reaction thereto, arranging that by actuating the at least one setting operating element, a manual change of a gear of the transmission can be effectuated.

According to a further aspect, a software (SW) program is described. The SW program can be configured to be executed on a processor (for example on a control unit of a vehicle) and thus to carry out one of the methods described in this document.

According to a further aspect, a storage medium is described. The storage medium can comprise an SW program which is configured to be executed on a processor and thus to carry out one of the methods described in this document.

It is to be noted that the methods, devices, and systems described in this document can be used both alone and in combination with other methods, devices, and systems described in this document. Furthermore, any aspects of the methods, devices, and systems described in this document can be combined with one another in manifold ways. In particular, the features of the claims can be combined with one another in manifold ways.

The invention is described in more detail hereinafter on the basis of exemplary embodiments.

DETAILED DESCRIPTION OF THE DRAWINGS

Figure 1:
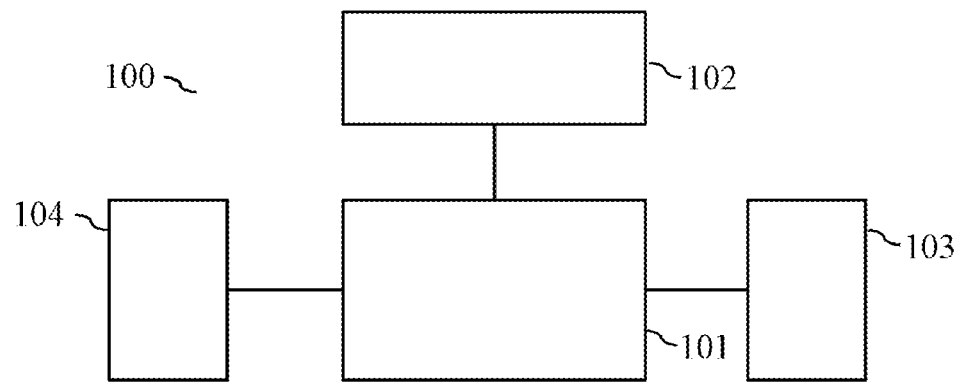
FIG. 1 shows exemplary components of a vehicle.

As described at the outset, the present document thus relates to enabling the user of a vehicle to operate in an efficient manner an automatic transmission in a manual shift mode. In this context, FIG. 1 shows exemplary components of a vehicle 100. In particular, FIG. 1 shows a drive engine 104 of the vehicle 100, which is configured to drive the vehicle 100. Furthermore, the vehicle 100 comprises an automatic transmission 103, which is configured to change the transmission ratio between the shaft of the drive engine 104 and a driven axle of the vehicle 100. The transmission 103 can have, for example, 2 or more, 4 or more, 5 or more, or 6 or more gears (for forward travel). Furthermore, the vehicle 100 can comprise a clutch 102 (for example as part of the transmission 103) to decouple the drive engine 104 from the driven axle of the vehicle 100 for a gear change or to couple it thereto.

Figure 2:
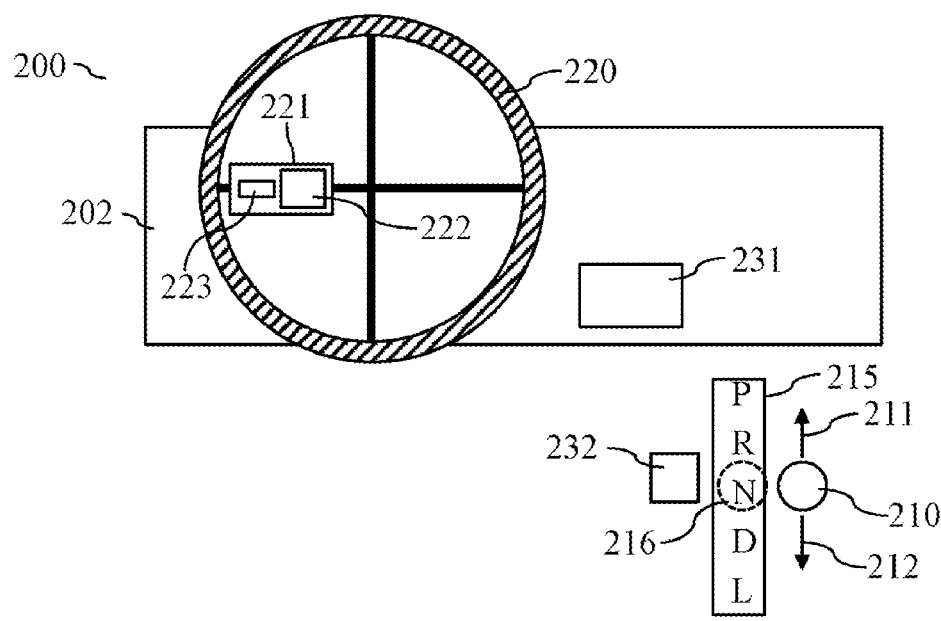
FIG. 2 shows exemplary operating elements of a vehicle having an automatic transmission.

FIG. 2 shows an exemplary driver position 200 of a vehicle 100 which comprises an automatic transmission 103. In particular, FIG. 2 shows a steering device 220, in particular a steering wheel, for steering the vehicle 100, which is typically arranged on a dashboard 202 of the vehicle 100. In the center console of the vehicle 100, a gear selection operating element 210, in particular a gear selection lever or a gear selection switch, can be arranged. A gear selection lever or a gear selection switch is described by way of example hereinafter. However, the aspects described in this document apply generally for a gear selection operating element.

In the case of an automatic transmission 103, different gear stages 215, e.g., the gear stages "N", "D", "R", "L", and/or "P", can typically be set via the gear selection lever 210. In the gear stage "N", the drive engine 104 is typically decoupled and the transmission lock of the transmission 103 is typically deactivated. In the gear stage "P", the drive engine 104 is typically decoupled and the transmission lock of the transmission 103 is typically activated. In the gear stage "D", the drive engine 104 is typically coupled to the driven axle for forward travel. In the gear stage "L", the drive engine 104 is typically coupled to the driven axle for forward travel, but has a lower gear than in the gear stage "D" (for example to provide an engine brake function during a hill descent). In the gear stage "R", the drive engine 104 is typically coupled to the driven axle for reverse travel. The respective set gear stage 215 can be displayed by a display element 216 (for example by illumination of a letter for the respective set gear stage 215). It is to be noted that the gear stage "P" can possibly be set via a separate button (and not via the gear selection lever 210).

The gear selection lever 210 is preferably designed to be monostable, so that the gear selection lever 210 moves back into a base location or base position after a deflection. By deflecting the gear selection lever 210 in a first (for example in a forward) direction 211, it can be effectuated that the gear stages 215 can gradually be set from the gear stage "L" to the gear stage "P" (for example according to the series of gear stages L, D, N, R, P). By deflecting the gear selection lever 210 in an (opposite) second (for example in a reverse) direction 212, it can be effectuated that the gear stages 215 can gradually be set from the gear stage "P" to the gear stage "L" (for example according to the series of gear stages P, R, N, D, L). Each change of the gear stage 215 can typically be effectuated here by a relatively short deflection (for example having a trigger duration of approximately 1 second) in one of the two directions 221, 212.

The gear stages 215 can be changed by means of the deflection of the gear selection lever 215 by repeated deflection in the first direction 211 from a first limiting gear stage (for example the gear stage "L" or "D") up to the second limiting gear stage (for example the gear stage "P" or "N"). Starting from the second limiting gear stage, typically no further gear stage change can be effectuated by a deflection in the first direction 211. In a corresponding manner, the gear stages 215 can be changed by means of the deflection of the gear selection lever 215 by repeated deflection in the second direction 212 from the second limiting gear stage (for example the gear stage "P" or "N") up to the first limiting gear stage (for example the gear stage "L" or "D"). Starting from the first limiting gear stage, typically no further gear stage change can be effectuated by a deflection in the second direction 212.

Furthermore, one or more function operating elements 221 can be arranged at the driver position 200, which enable the driver of the vehicle 100 to control a function of the vehicle 100, in particular a driver assistance function of the vehicle 100. For example, the one or more function operating elements 221 can enable the driver to operate a cruise control and/or an ACC (adaptive cruise control) function of the vehicle 100. The one or more function operating elements 221 can be arranged on the steering device 220.

The one or more function operating elements 221 can comprise an activation operating element 222, which enables the driver to activate or deactivate the function (in particular the driver assistance function). Furthermore, the one or more function operating elements 221 can comprise at least one setting operating element 223, which enables the driver of the vehicle 100 to set a parameter of the function. The parameter can be such that the parameter can assume values from a linearly and/or continuously increasing value range between a minimum value and a maximum value. The setting operating element 223 can be designed in such a way that a value from the value range of the parameter of the function can be selected in a comfortable manner using the setting operating elements 223.

The one or more setting operating elements 223 can be designed in particular in such a way that an increase of the value of the parameter can be effectuated by actuating the one or more setting operating elements 223 in a first way and a reduction of the value of the parameter can be effectuated by actuating the one or more setting operating elements 223 in a second way.

For example, the setting operating element 223 can comprise a rocker switch, using which the value of the parameter can be increased (deflection according to a first way, for example in a first direction) or reduced (deflection according to a second way, for example in a second direction) depending on the deflection of the rocker switch. Alternatively or additionally, the setting operating element 223 can comprise a plus button, using which the value of the parameter can be increased (actuation of the setting operating element 223 in a first way, for example to the right or upward) and a minus button, using which the value of the parameter can be reduced (actuation of the setting operating element 223 in a second way, for example to the left or downward). Alternatively or additionally, the setting operating element 223 can comprise a slider, using which the value of the parameter can be increased (actuation of the setting operating element 223 in a first way) or reduced (actuation of the setting operating element 223 in a second way) depending on the slide direction. Alternatively or additionally, the setting operating element 223 can comprise a rotating knob, using which the value of the parameter can be increased (actuation of the setting operating element 223 in a first way) or reduced (actuation of the setting operating element 223 in a second way) depending on the rotational direction.

The setting operating element 223 can therefore have a semantic coding which enables an increase of the value of the parameter to be effectuated by actuation of the setting operating element 223 in a first way and a reduction of the value of the parameter to be effectuated by an actuation of the setting operating element 223 in a second way (different from the first way).

The control unit 101 of the vehicle 100 can be configured to detect that the gear selection lever 210 is deflected at least for a minimum duration in the second direction 212. The minimum duration is typically longer than the minimum required trigger duration, by which a gear stage change can be effectuated, in particular by the factor 3 or more, 5 or more, or 10 or more. For example, the minimum duration can be 5 seconds or more.

Furthermore, the control unit 101 can be configured to detect that the deflection of the gear selection lever 210 takes place while the transmission 103 is in a gear stage 215, in which no further change of the gear stage 215 can be effectuated by a deflection in the second direction 212. In other words, it can be detected that the relatively long deflection of the gear selection lever 210 takes place in the second direction 212, while the transmission 103 is in the first limiting gear stage. In particular, it can be detected that the transmission 103 is already in the gear stage "L" upon the detected deflection of the gear selection lever 210.

Furthermore, it can be checked whether the function of the vehicle 100 which can be set via the setting operating element 223 is activated or not.

In reaction to the detected deflection of the gear selection lever 210, it can be effectuated that the transmission 103 is transferred from an automatic operation or mode into a manual operation or mode. In particular, the transmission 103 can be transferred into the manual operation or mode if
  starting from the first limiting gear stage, a relatively long deflection of the gear selection lever 210 takes place in the second direction 212; and
  the function of the vehicle 100 which can be operated by means of the one or more setting operating elements 223 is deactivated.

It can be communicated to the driver of the vehicle 100 via one or more output elements 231, 232 at the driver position 200 that the transmission 103 is in the manual operation or mode. For example, a display 231 can be arranged on the dashboard 202, in which it can be displayed that the transmission 103 is in the manual mode. Furthermore, the respective engaged gear can possibly be displayed. Alternatively or additionally, it can be displayed by a display 232 on the gear selection lever 210 (in the center console) that the transmission 103 is in the manual mode.

When the transmission 103 is in the manual mode, gear changes of the transmission 103 can be effectuated manually by the driver of the vehicle 100 by actuating the one or more setting operating elements 223. In particular, the one or more setting operating elements 223 can be actuated in a first way (or alternatively in a second way) to manually increase the gear or can be actuated in a second way (or alternatively in a first way) to manually reduce the gear. The respective presently set gear can be output (in particular displayed) in the one or more output elements 231, 232.

The control unit 101 can be configured to detect that the function of the vehicle 100 for which the one or more setting operating elements 223 are actually provided is activated (for example by actuating the activation operating element 222). In reaction thereto, it is possible to automatically effectuate that the transmission 103 is transferred back into the automatic mode.

Alternatively or additionally, the transition of the transmission 103 from the manual mode into the automatic mode can be effectuated by deflecting the gear selection lever 210 in the first direction 211 or the second direction 212. In particular, the control unit 101 can be configured to transfer the transmission 103 into the automatic mode as soon as it is detected that the gear selection lever 210 is deflected in the first direction 211. A transition into the gear stage "D" can possibly be effectuated here by an actuation of the gear selection lever 210 in the second direction 212. A transition into the gear stage "N" can possibly be effectuated by an actuation of the gear selection lever 210 in the first direction 211, or (if the vehicle 100 is at a standstill), a transition into the gear stage "R".

Even in the case of a gear selection lever 210, which is only provided for setting gear stages 215 in an automatic mode of the transmission 103, efficiently enabling manual shifting of the gears of the transmission 103 can thus be made possible. For this purpose, first a forward gear stage "D" or "L" is engaged by means of the gear selection switch or gear selection lever 210. Then, via a chronologically relatively long longitudinal pull (for example t>5 seconds) of the gear selection switch 210 in the direction 212 of the travel mode D/L (for example to the rear), the transmission mode can be switched over into a manual mode. The display of the activated manual mode can take place after switching over in the instrument cluster of the vehicle 100 by means of a display 231 M1, . . . , Mx and/or by means of a display 232 in the shift scheme of the gear selection switch 210 as M (for example with arrow upward and arrow downward).

After completed switching over into the manual transmission mode, for example, the gears can be manually shifted using the +/− rocker 223 of the steering wheel buttons 221 (for example on the left side of the steering wheel 220), which actually enables the adjustment of the set velocity for the cruise control. This can take place according to the inscription "+" for upshifting gears and "−" for downshifting gears.

The manual mode of the transmission 103 can be exited, for example, in that the gear selection switch is actuated in the direction 212 driving mode D/L (to the rear) and/or in the direction 211 driving mode N or possibly at a standstill R (to the front). Alternatively or additionally, the manual mode can immediately be exited again in the direction of automatic standard or permanent mode of the transmission 103 if a driver assistance system is activated via one of the steering wheel buttons 221, for example, by activating the speed limit device (LIM) or by activating the cruise control (for example active cruise control or dynamic cruise control).

Figure 3:
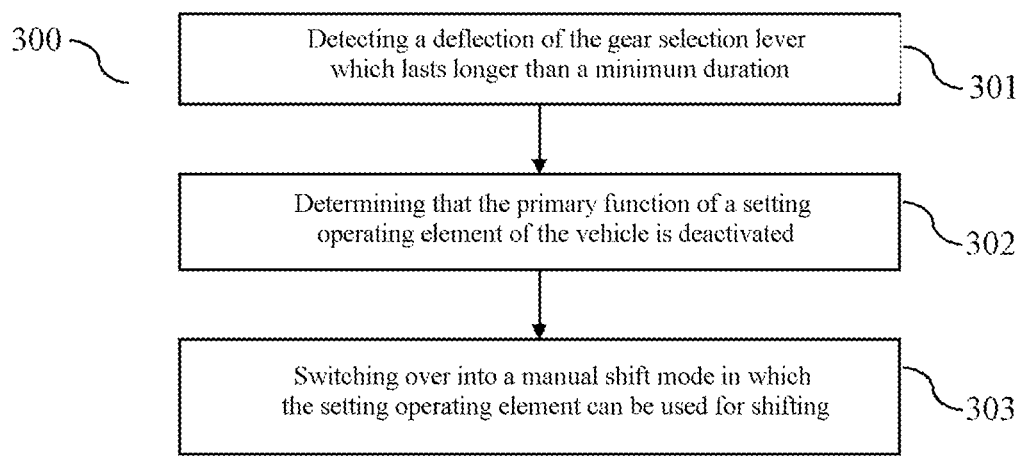
FIG. 3 shows a flow chart of an exemplary method for providing a manual shift mode for an automatic transmission of a vehicle.

FIG. 3 shows a flow chart of an exemplary method 300 for operating an automatic transmission 103 of a vehicle 100. The method 300 can be executed by a control unit 101 of the vehicle 100. The automatic transmission 103 can be designed to be operated in an automatic shift mode in which the gears of the transmission 103 can be automatically adapted to the respective driving situation (in particular if the transmission 103 is in the gear stage "D" or "L"). Furthermore, the transmission 103 can be designed to be operated in a manual driving mode in which the gears of the transmission 103 can be set manually by a driver of the vehicle 100 and/or can be adapted to the respective driving situation.

The vehicle 100 comprises a gear selection operating element 210 (in particular a gear selection lever), which enables a user (in particular the driver) of the vehicle 100 to set different gear stages 215 of the transmission 103 by actuating the gear selection operating element 210. In this case, the gear selection operating element 210 can be designed in a cost-effective manner in such a way that a manual gear change cannot be effectuated by the gear selection operating element 210 (in addition to the setting of the gear stages 215).

Furthermore, the vehicle 100 comprises at least one setting operating element 223, which enables the user to change a value of a parameter of a function of the vehicle 100 by actuating the setting operating element 223 when the function of the vehicle 100 is activated. The function of the vehicle 100 can be essentially independent of the transmission 103 of the vehicle 100 here. In particular, the set value of the parameter can be such that the set value of the parameter does not have a direct effect on the set gear of the transmission 103. Alternatively or additionally, the setting operating element 223 can primarily not be provided for the manual change of gears of the transmission 103, but rather for setting the value of the parameter of the function of the vehicle 100 (in particular if the function of the vehicle 100 is active). The function of the vehicle 100 can comprise a driver assistance function and/or a comfort function of the vehicle 100.

The method 300 comprises detecting 301 an actuation of the gear selection operating element 210 for a duration which is equal to or longer than a minimum duration (for example 3 seconds or more or 5 seconds or more). A relatively long actuation (in particular deflection) of the gear selection operating element 210 can thus be detected.

In addition, the method 300 comprises determining 302 that the function of the vehicle 100 is deactivated. The setting operating element 223 can be designed here in such a way that no changes of the value of the parameter can be effectuated by the actuation of the setting operating element 223 when the function of the vehicle 100 is deactivated. The function can be activated or deactivated, for example, by a dedicated activation operating element 222.

Furthermore, the method 300 comprises, in reaction thereto (in particular in reaction to detecting 301 a relatively long actuation of the gear selection operating element 210 and determining 302 that the function of the vehicle 100 is deactivated), arranging 303 that a manual change of a gear of the transmission 103 can be effectuated by actuating the at least one setting operating element 223. The setting operating element 223 can thus be used in an efficient manner for a manual shift mode of the transmission 103 and/or for manual gear changes.

By way of the measures described in this document, a manual shift mode of the transmission 103 can also be provided in an efficient manner upon use of a monostable gear selection switch or gear selection lever 210 (having only a single lane).

The present invention is not restricted to the exemplary embodiments shown. In particular, it is to be noted that the description and the figures are only to illustrate the principle of the proposed methods, devices, and systems.

What is claimed is:

1. An apparatus for an automatic transmission of a vehicle equipped with a gear selection operating element which enables a user of the vehicle to set different gear stages of the transmission by actuating the gear selection operating element, and with at least one setting operating element which enables the user to change a value of a parameter of a function of the vehicle by actuating the setting operating element when the function of the vehicle is activated, the apparatus comprising:
- a control unit of the vehicle, the control unit being configured to:
  - detect an actuation of the gear selection operating element for a duration which is equal to or longer than a threshold duration,
  - determine that the function of the vehicle is deactivated, and
  - in reaction thereto, arrange that a manual change of a gear of the transmission can be effectuated by actuating the at least one setting operating element,
  - wherein at least one of:
    - the function of the vehicle comprises a driver assistance function,
    - the function of the vehicle enables an at least partially automated longitudinal guidance of the vehicle,
    - the function of the vehicle enables automated limiting and/or automated setting of a travel velocity of the vehicle, wherein the parameter comprises a travel velocity of the vehicle, or
    - the function of the vehicle enables an audio playback of audio signals in the vehicle, wherein the parameter comprises a volume of the audio playback.

2. The apparatus according to claim 1, wherein
the value of the parameter can be set in a value range between a first threshold value and a second threshold value by actuating the setting operating element when the function of the vehicle is activated, and/or
the control unit is configured to ignore an actuation of the setting operating element with respect to a setting of the value of the parameter of the function of the vehicle when the function of the vehicle is deactivated.

3. The apparatus according to claim 1, wherein at least one of:
  (i) the setting operating element comprises a rocker switch, which is designed to:
    - be tilted in a first direction to increase the value of the parameter when the function of the vehicle is activated or to increase the gear of the transmission manually when the transmission is in a manual shift mode; and/or
    - be tilted in a second direction to reduce the value of the parameter when the function of the vehicle is activated or to reduce the gear of the transmission manually when the transmission is in the manual shift mode;
  (ii) the setting operating element comprises a plus button which is designed to increase the value of the parameter as a result of an actuation when the function of the vehicle is activated or to increase the gear of the transmission manually when the transmission is in the manual shift mode;
  (iii) the setting operating element comprises a minus button which is designed to reduce the value of the parameter as a result of an actuation when the function of the vehicle is activated or to reduce the gear of the transmission manually when the transmission is in the manual shift mode;
  (iv) the setting operating element comprises a slider which is designed to:
    - be pushed in a first direction to increase the value of the parameter when the function of the vehicle is activated or to increase the gear of the transmission manually when the transmission is in the manual shift mode; and/or
    - be pushed in a second direction to reduce the value of the parameter when the function of the vehicle is activated or to reduce the gear of the transmission manually when the transmission is in the manual shift mode; or
  (v) the setting operating element comprises a rotating knob, which is designed to:
    - be rotated in a first direction to increase the value of the parameter when the function of the vehicle is activated or to increase the gear of the transmission manually when the transmission is in the manual shift mode; and/or
    - be rotated in a second direction to reduce the value of the parameter when the function of the vehicle is activated or to reduce the gear of the transmission manually when the transmission is in the manual shift mode.

4. The apparatus according to claim 1; wherein
the gear selection operating element is designed to change the gear stage starting from a second limiting gear stage to a first limiting gear stage by repeated actuation in a second direction,
the gear selection operating element is designed such that starting from the first limiting gear stage, no further gear stage change can be effectuated by an actuation in the second direction, and
the control unit is configured to:
  detect that the gear selection operating element is actuated starting from the first limiting gear stage for the threshold duration or longer in the second direction; and
  in reaction thereto, arrange that a manual gear change of the transmission can be effectuated by actuating the at least one setting operating element.

5. The apparatus according to claim 1; wherein the control unit is configured to:
  activate a manual shift mode of the transmission when it is detected that the gear selection operating element is actuated for the threshold duration or longer and when it is determined that the function of the vehicle is deactivated; and
  enable one or more corresponding gear changes by one or more actuations of the setting operating element when the transmission is in the manual shift mode.

6. The apparatus according to claim 5, wherein the control unit is configured to:
  detect that the gear selection operating element is actuated and/or that the function of the vehicle is activated, while the transmission is in the manual shift mode; and
  in reaction thereto, transfer the transmission from the manual shift mode into an automatic shift mode, wherein the transmission is designed to change the gears of the transmission automatically in the automatic shift mode.

7. The apparatus according to claim 1, wherein at least one of:
  the gear selection operating element comprises a gear selection lever, which is deflectable in a first direction or in a second direction to change the gear stage of the transmission,
  the gear selection operating element is monostable, so that the gear selection operating element automatically returns back into a base position after an actuation, the gear selection operating element only has a single lane for setting gear stages, or the gear selection operating element is not designed to enable manual changes of a gear of the transmission.

8. A method for operating an automatic transmission of a vehicle equipped with a gear selection operating element which enables a user of the vehicle to set different gear stages of the transmission by actuating the gear selection operating element, and with at least one setting operating element which enables the user to change a value of a parameter of a function of the vehicle by actuating the setting operating element if the function of the vehicle is activated; wherein the method comprises:

detecting an actuation of the gear selection operating element for a duration which is equal to or longer than a threshold duration;

determining that the function of the vehicle is deactivated; and in reaction thereto, arranging that by actuating the at least one setting operating element, a manual change of a gear of the transmission can be effectuated, wherein at least one of:

the function of the vehicle comprises a driver assistance function, the function of the vehicle enables an at least partially automated longitudinal guidance of the vehicle, the function of the vehicle enables automated limiting and/or automated setting of a travel velocity of the vehicle, wherein the parameter comprises a travel velocity of the vehicle, or the function of the vehicle enables an audio playback of audio signals in the vehicle, wherein the parameter comprises a volume of the audio playback.

9. The method according to claim 8, further comprising:

activating a manual shift mode of the transmission when it is detected that the gear selection operating element is actuated for the threshold duration or longer and when it is determined that the function of the vehicle is deactivated; and enabling one or more corresponding gear changes by one or more actuations of the setting operating element when the transmission is in the manual shift mode.

10. The method according to claim 9, further comprising:

detecting that the gear selection operating element is actuated and/or that the function of the vehicle is activated, while the transmission is in the manual shift mode; and in reaction thereto, transferring the transmission from the manual shift mode into an automatic shift mode, wherein the transmission is designed to change the gears of the transmission automatically in the automatic shift mode.

* * * * *